US006376133B1

(12) United States Patent
Phillips

(10) Patent No.: US 6,376,133 B1
(45) Date of Patent: *Apr. 23, 2002

(54) COLOR FILTERS FOR DISPLAYS

(75) Inventor: Roger Winston Phillips, Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/703,992

(22) Filed: Nov. 1, 2000

Related U.S. Application Data

(62) Division of application No. 09/439,204, filed on Nov. 12, 1999, now abandoned, which is a continuation of application No. 09/106,885, filed on Jun. 30, 1998, now Pat. No. 6,132,909, which is a continuation of application No. 08/625,580, filed on Mar. 28, 1996, now Pat. No. 5,792,579.

(51) Int. Cl.$^7$ ........................... G02F 1/1335; G02B 5/20
(52) U.S. Cl. .......................................................... 430/7
(58) Field of Search ............................... 430/7; 349/106

(56) References Cited

U.S. PATENT DOCUMENTS

| | | | |
|---|---|---|---|
| 4,792,860 A | 12/1988 | Kuehrle | 358/300 |
| 4,962,081 A | 10/1990 | Harrison et al. | 503/227 |
| 4,965,242 A | 10/1990 | DeBoer et al. | 503/227 |
| 5,073,534 A | 12/1991 | Harrison et al. | 503/227 |
| 5,132,820 A | 7/1992 | Someya et al. | 359/59 |
| 5,171,650 A | 12/1992 | Ellis et al. | 430/20 |
| 5,229,232 A | 7/1993 | Longobardi et al. | 430/7 |
| 5,235,447 A | 8/1993 | Hepp et al. | 359/54 |
| 5,242,889 A | 9/1993 | Shuttleworth et al. | 503/227 |
| 5,308,737 A | 5/1994 | Bills et al. | 430/201 |
| 5,340,619 A | 8/1994 | Chen et al. | 424/498 |

(List continued on next page.)

FOREIGN PATENT DOCUMENTS

EP 365219 12/1994

OTHER PUBLICATIONS

William A. Tolbert, et al., "High–Speed Color Imaging by Laser Ablation Transfer with a Dynamic Release Layer: Fundamental Mechanisms," Journal of Imaging Science and Technology, vol. 37, No. 4, Jul./Aug. 1993, pp. 411–421.

I–Yin Sandy Lee, et al., "Dynamics of Laser Ablation Transfer for Imaging Investigated by Ultrafast Microscopy," Journal of Imaging Science and Technology, vol. 36, No. 2, Mar./Apr. 1992.

Kido, Junji, et al., "Multilayer White Light–Emitting Organic Electroluminesweent Device," Science, vol. 267, Mar. 3, 1995, pp. 1332–1334.

Kido, Junji, et al., "White Light–Emitting Organic Electroluminescent Devices Using the Poly (N–vinylcarbazole) Emitter Layer Doped With Three Fluorescent Dyes," Appl. Phys. Lett. 64(7), Feb. 14, 1994, pp. 815–817.

Dagani, Ron, "Advance Made in Light–Emitting Devices," C&EN, Mar. 6, 1995, p. 8.

Hunninghake, J., et al., "26.3: A Systems Approach to Color Filters for Flat–Panel Displays," SID 94 Digest, pp. 407–410.

(List continued on next page.)

Primary Examiner—John A. McPherson
(74) Attorney, Agent, or Firm—Workman, Nydegger & Seeley

(57) ABSTRACT

Color filters are provided comprising a transparent substrate and a repeating pattern of colored pixels on the substrate thereby forming the color filters, wherein each of the pixels comprises a plurality of small colorant areas, referred to as a sub-pixel. Processes forming pixels comprising a plurality of sub-pixels exhibit a drastic increase in the formation of usable color filters, resulting in greatly improved yields.

6 Claims, 5 Drawing Sheets

U.S. PATENT DOCUMENTS

| | | | |
|---|---|---|---|
| 5,520,952 A | 5/1996 | Tanitsu et al. | 427/58 |
| 5,521,035 A | 5/1996 | Wolk et al. | 430/20 |
| 5,576,265 A | 11/1996 | DeBoer et al. | 503/227 |
| 5,641,595 A | 6/1997 | Hsieh et al. | 430/7 |
| 5,670,205 A | 9/1997 | Miyazaki et al. | 427/64 |
| 5,705,302 A | 1/1998 | Ohno et al. | 430/7 |
| 5,726,724 A | 3/1998 | Shirota et al. | 349/106 |
| 5,786,090 A | 7/1998 | Fisher et al. | 428/411.1 |
| 5,792,579 A | 8/1998 | Phillips | 430/7 |
| 5,824,374 A | 10/1998 | Bradley, Jr. et al. | 427/555 |
| 6,057,067 A | 5/2000 | Isberg et al. | 430/7 |
| 6,084,650 A | 7/2000 | Sekiguchi | 349/106 |
| 6,099,994 A | 8/2000 | Chang et al. | 430/20 |
| 6,132,909 A * | 10/2000 | Phillips | 430/7 |

OTHER PUBLICATIONS

William A. Tolbert; I–Yin Sandy Lee; Xiaoning Wen; and, Dana D. Dlott, "Laser Ablation Transfer Imaging Using Picosecond Optical Pulses: Ultra–High Speed, Lower Threshold and High Resolution," Journal of Imaging Science and Technology, vol. 37, No. 5, Sep./Oct. 1993, pp. 485–489.

C. A. Bruce, et al., "Delayed Tack Ribbon for Laser Transfer and Other Printing," IBM Technical Disclosure Bulletin, vol. 19, No. 2, p. 672, Jul., 1976.

Jonathan W. Mayo, et al., "16.3: Colour Filters for Flat Panel Displays by High Definition Ink Jet Printing," Euro Display, pp. 537–540, 1996.

* cited by examiner

127 M SQUARE

127 M SQUARE

127 M SQUARE

COLOR FILTERS FOR DISPLAYS

This application is a divisional of U.S. application Ser. No. 09/439,204, filed Nov. 12, 1999, now abandoned, which is a continuation of U.S. application Ser. No. 09/106,885, filed Jun. 30, 1998, now U.S. Pat. No. 6,132,909, which is a continuation of U.S. application Ser. No. 08/625,580, filed Mar. 28, 1996, now U.S. Pat. No. 5,792,579.

BACKGROUND OF THE INVENTION

1. The Field of the Invention

The present invention is directed to color filters and methods for preparing color filters. In particular, the present invention is directed to color filters for use in visual displays and methods for preparing the same.

2. The Relevant Technology

Color filters are used to produce full color images in visual displays. The three primary colors, red, green and blue used to produce full color images in projection displays, flat panel displays and other visual display devices are most commonly provided by color filters.

Generally, color filters consist of a transparent substrate having a repeating pattern of pixels on its surface. Pixels are defined as the smallest controllable area on visual displays, having the same color that are capable of being located and turned "on" and "off" by a computer display. Each pixel on a color filter is associated with a primary color, and is arranged with other color pixels in repeating arrays of red, green and blue triads. Depending upon which pixels light is passed through, color filters containing pixels of the three primary colors are capable of producing color images of a wide variety of colors.

Although the use of color filters to produce full color images has long been known, color filters continue to occupy the highest proportion of material costs in visual displays, such as flat panel displays. This expense can be attributed to a number of factors, such as color filter material costs and the number of manufacturing steps; however, the high cost of color filters is primarily due to low yields observed in color filter manufacturing processes.

Yields in color filter manufacturing process are determined by the number of color filters produced that meet industry standards out of the total number of filters produced. Panels not meeting industry standards of approximately 3 to 4 defects per ten inch diagonal must be discarded thereby reducing color filter manufacturing yields and resulting in high production cost and low consumer availability. A common defect and major contributor to the low yields presently experienced in the industry is the omission of pixels, a phenomenon commonly referred to as "drop out." When "drop out" occurs, uncolored, unfiltered light passes through the filter to the eye of an observer as opposed to the color intended to be produced.

Originally, color filters were prepared by a dyeing, or gelatin process in which a layer of gelatin or other dyeable material formed on the interior of a transparent substrate was colored using photolithography techniques. More recently, polyimide systems comprising thermally stable dyes combined with polyimides, have been incorporated into photolithography processes to improve filter quality. Although color filters prepared using photolithography exhibit good resolution and color quality, photolithography is labor intensive and results in poor yields. For example, photolithography requires that each color incorporated onto the filter have a mask, a photoresist, baking and etching steps, and resist removal. To produce a color filter having the three primary colors, this process must be repeated three times.

Because of the complexity of the photolithography process and the tedious steps that must be repeated for each primary color, photolithography processes have consistently given unsatisfactory yields, typically on the order of 50%. Even after repairing defective color filters by repeating the photolithography process for omitted pixels, the yield only increases to approximately 70%. Taking into consideration the cost of repair and the high percentage of filters that remain unusable, there has for some time existed a need for a color filter manufacturing process having greater yields and consequently producing color filters at lower costs.

More recently, in an attempt to overcome the above-mentioned deficiencies, a dye diffusion process for making color filters has been proposed. In this process, a sublimable dye is transferred from a donor sheet containing the dye to a polymeric receiver sheet which becomes the color filter. An exemplary dye diffusion process is disclosed in DeBoer et al. U.S. Pat. No. 4,965,242. In DeBoer et al., a dye-donor element is placed over a dye receiving element, wherein the dye receiving element comprises a temporary support having thereon a polymeric alignment layer, transparent conducting layer and a polymeric dye receiving layer. Heat is applied to the donor element by radiation energy means, such as a thermal printing head or heat absorption by infrared dyes, causing the dye image to be transferred from the donor sheet to the receiver sheet. Once the transfer has occurred, the dye donor sheet is replaced with a glass support to form the color filter. Other patents disclosing similar dye diffusion processes for preparing color filters include U.S. Pat. Nos. 4,962,081, 5,073,534, and 5,242,889.

Here again, although the dye diffusion process simplifies color filter manufacturing, adequate yields are still not attained. An additional drawback that adds to the low yields and increased cost of the color filter is that the dye diffusion process is presently limited to sublimable subtractive dyes, namely magenta, yellow and cyan.

Producing primary colors using subtractive dyes requires layers of magenta, yellow and cyan to be formed in various combinations to make red, blue and green additive colors. One exception is found in U.S. Pat. No. 5,242,889, issued to Shuttleworth, which discloses a blue sublimable dye. However, because the dye diffusion process must be repeated to form pixels associated with red and green, there exists a greater opportunity for a defect to occur, resulting in an increased number of unusable color filters and, consequently, the continuation of depressed yields.

As expected, the "drop out" rate in color filter manufacturing increases during mass production. In addition, as illustrated in FIG. 1, as the panel size increases, the number of "drop outs" rises dramatically. For example, a defect level of one defect per square inch sharply increases to approximately 50 defects per ten inch diagonal color filter as shown by line 30. A marked decrease can be attained by limiting the defects to 0.1 defects per square inch (line 32) and as shown by lines 34 and 36, the number of defects drops sharply when the number of defects is reduced to $\frac{1}{16}$ of a defect per square inch (line 34) and $\frac{1}{160}$ of a defect per square inch (line 36). Typically, color filters have dimensions of approximately 200 pixels per/inch (wherein 5 mils is equivalent to 127 microns). Panels having as few as three to four defects per ten square inch diagonal panel are considered unusable according to industry standards. Hence, it is not surprising that typical yields of current color filter manufacturing processes have heretofore been on the order of 50% and with repair approximately 70%.

Because of its high color quality, and despite attempts to improve its low yields, photolithography remains the process of choice in the production of color filters for visual displays. This being the case, there remains a need for a manufacturing process that produces color filters having good resolution and color quality in high yields.

SUMMARY AND OBJECTS OF THE INVENTION

It is, therefore, an object of the present invention to provide color filters for use in visual displays that are lower in cost than have heretofore been available.

It is another object of the present invention to provide methods for making color filters for visual displays that result in higher yields than have heretofore been attained.

It is a further object of the present invention to provide a color filter having good color quality and high resolution.

To achieve the foregoing objects, and in accordance with the invention as embodied and broadly described herein, the present invention is directed to color filters comprising a transparent substrate and a repeating pattern of colored pixels on the substrate thereby forming the color filter, wherein each of the pixels comprises a plurality of small colorant areas, hereinafter referred to as sub-pixels.

In accord with the present invention, and contrary to conventional knowledge, it has been discovered that processes forming pixels comprising a plurality of sub-pixels exhibit a drastic increase in the formation of usable color filters. When pixels comprising a plurality of sub-pixels are formed, the omission of less than all of the plurality of sub-pixels comprising the pixels will not necessarily result in an unusable pixel. Thus, color filters formed in accordance with the present invention have greatly improved yields. The repeating pattern of pixels are composed of a colorant material selected from the group consisting of dyes, pigments, inks, and mixtures thereof. Depending on the process employed, the materials used, and the purpose of the color filter, the colorant material used to form the pixels is selected so as to optimize the color quality of the color filter.

Resolution of the color filter formed in accordance with the present invention, is optimized by varying the size of the pixels and the number of sub-pixels comprising the pixel. For instance, reducing the size of the pixels in the repeating pattern of pixels and increasing the number of pixels on a transparent substrate produces a color filter having increased resolution.

In a preferred embodiment of the present invention, the color filter comprises a transparent glass substrate and a repeating pattern of color pixels on the substrate forming the color filter, wherein each pixel is comprised of sixteen sub-pixels. With each pixel comprising sixteen sub-pixels, the omission of a few sub-pixels constructing the pixel is not visible to the human eye. Furthermore, it is highly improbable that more than three or four sub-pixels will be omitted during pixel formation. Hence, virtually one hundred percent yield will be achieved when the pixels formed on the substrate are composed of 16 sub-pixels. Higher than current yields may also be obtained when using pixels having more than one but fewer than 16 sub-pixels, although the yield may not be as high as when using 16 sub-pixels.

These and other objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention is directed to color filters and methods for producing color filters for visual display devices.

Currently, color filter manufacturing technology suffers in that for various reasons pixels occasionally fail to form on the transparent substrate, resulting in the omission of pixels. This phenomenon is referred to in the trade as "drop out." When a certain number of pixels, typically three to four pixels for a ten square inch diagonal substrate, do not form on the transparent substrate, the substrate is considered by industry standards to be unusable and must be discarded. "Drop out" resulting in poor color filter manufacturing yields has been a problem since the development of color filters for visual displays. These low yields increase the cost of color filters and consequently contribute to the high cost of color displays.

It is a feature of the present invention that the yield can be greatly improved by forming a plurality of sub-pixels on a transparent substrate, so that the plurality of sub-pixels form one pixel. As used in this application, a sub-pixel is an area of colorant formed on substrates used for color filters.

It is readily appreciated that forming each pixel with a plurality of sub-pixels significantly reduces the effect of "drop out" or omission of sub-pixels on color filters. It is further appreciated that the effect "drop out" has on the appearance of a pixel is dependent on the number of sub-pixels comprising the pixel. For example, if the pixel is comprised of sixteen sub-pixels, the omission of one sub-pixel will have virtually no effect on the appearance of the pixel to an ordinary observer. Even the loss of 3 or 4 sub-pixels per pixel does not significantly affect the effectiveness of the pixel. It is still further appreciated that unless all the sub-pixels comprising a pixel are omitted, the pixel will be at least partially operable. Hence, the chance that a substrate will be unusable sharply decreases as the number of sub-pixels comprising the pixels increases.

As used herein, the term "color filter" defines materials used to provide color in visual display devices including, but not limited to, computers, calculators, televisions, clocks, analog displays in measuring devices, instruments, household appliances and audio equipment. Generally, color filters comprise a transparent substrate and a repeating pattern of colored pixels on the substrate. In color filters, the pixels are associated with the three primary colors red, green and blue, and are typically arranged in three color triads located on the surface of the substrate. Depending on the amount and manner in which light is passed through the pixels, full color images can be produced by a color filter having pixels corresponding to the three primary colors.

Figure 6:
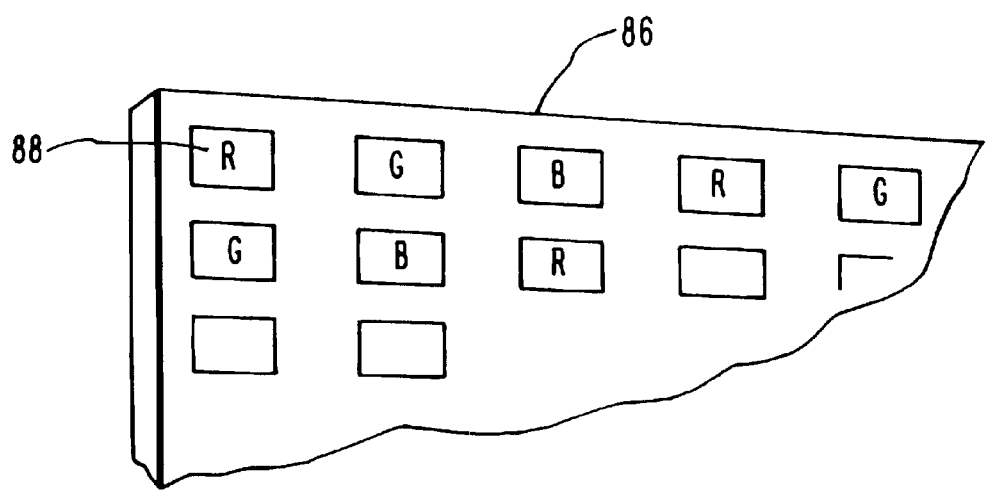
FIG. 6 illustrates a color filter having a primary color pixel array comprising red, green and blue pixels.

As illustrated in FIG. 6, color filters 86 have heretofore been comprised of a multiplicity of color pixels 88 associated with the primary colors, red, blue, or green. Traditionally, these color pixels have been composed of a single small area of one color that is controlled, or turned "on" and "off," electronically. As mentioned above, it is common in color filter manufacturing processes for a pixel to be unintentionally omitted for one reason or another, resulting in white light being emitted through the filter, tainting the color filter and often rendering it commercially unusable.

As mentioned above, pixels formed according to the present invention can be composed of a plurality of sub-pixels rather than being made from one continuous area of color, and the plurality of sub-pixels forming the pixel can be "turned on and off" collectively. Depending on the size or shape of the pixel desired, the number of sub-pixels can widely vary. The flexibility of forming different shapes and sizes of pixels with groups of sub-pixels not only allows the user to optimize resolution, but also allows for a greater margin of error when forming the pixels. For example, because the human eye cannot distinguish images below a certain level, a pixel comprising multiple sub-pixels is able to at least partially conceal defects such as "drop outs".

Figure 7A:
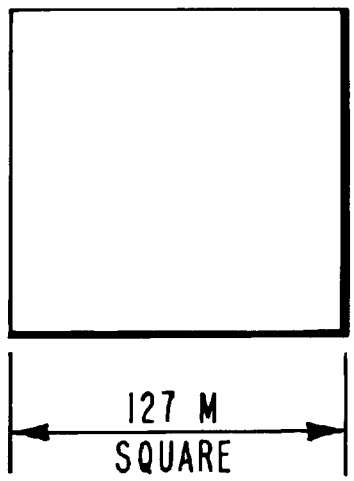
FIG. 7A is an exploded illustration of a conventional pixel.

FIG. 7A schematically illustrates the conventional pixel being composed of one continuous area of dye. If a mistake occurs resulting in a failure to produce a pixel in this area, an observer will see white unfiltered light. Typically, three or four mistakes on a ten square inch screen will render the color filter commercially unusable. Mistakes resulting in the "drop out" of entire color pixels cost industry millions of dollars each year.

Figure 7B:
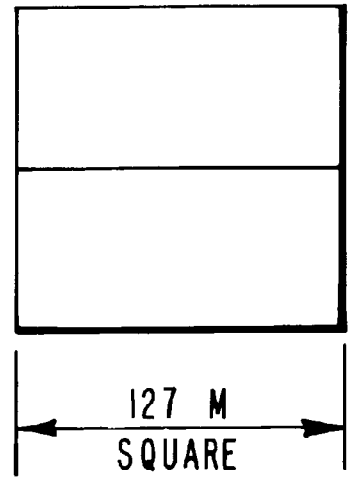
FIG. 7B is an exploded illustration of a pixel formed by a laser ablation transfer process comprising two sub-pixels.
Figure 7C:
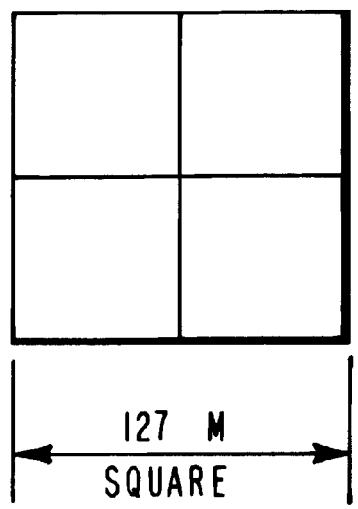
FIG. 7C is an exploded illustration of a pixel formed by laser ablation transfer comprising four sub-pixels.
Figure 7D:
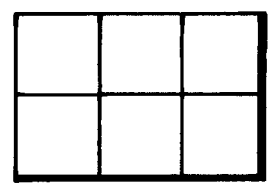
FIG. 7D is an exploded illustration of a pixel formed by laser ablation transfer comprising six sub-pixels.
Figure 7E:
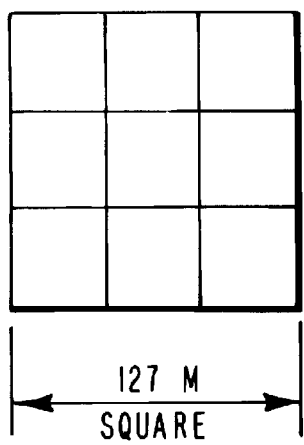
FIG. 7E is an exploded illustration of a pixel formed by laser ablation transfer comprising nine sub-pixels.
Figure 7F:
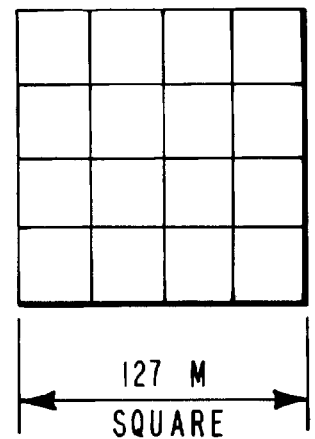
FIG. 7F is an exploded illustration of a pixel formed by laser ablation transfer comprising sixteen sub-pixels.

It is a feature of the present invention to reduce the incidence of unusable color filters by forming each pixel from a plurality of sub-pixels rather than a single sub-pixel. For example, by referring to FIG. 7B, it will be appreciated that if a pixel having the same area as the pixel illustrated in FIG. 7A is composed of two sub-pixels, a mistake resulting in the absence of one sub-pixel does not have the same dramatic effect as the "drop out" of a pixel, as shown in FIG. 7A. Thus, the failure to produce one of the two sub-pixels forming the pixel is more acceptable, allowing for a higher percentage of failures to be tolerated. In fact, unless all of the sub-pixels comprising a pixel are omitted, the pixel will at least have the partial appearance of the desired color and, thus, at least be partially operable. Hence, pixels comprising four sub-pixels decrease the impact of a mistake on the appearance of the color filter as shown in FIG. 7C. It will be appreciated, looking to FIGS. 7D–7F which illustrate pixels composed of six, nine and sixteen sub-pixels, that as the number of sub-pixels composing a pixel increases, the less impact a mistake will have on the usability of the color filter.

Although pixels composed of sixteen sub-pixels are currently preferred, any number of sub-pixels can be used to form pixels. It is noted that sub-pixels having a diameter in the range of 10 microns are capable of being formed using present technology, such as laser ablation transfer technology. This being the case, it is contemplated that a pixel of average size, i.e., 127 microns by 127 microns, can comprise at least 144 sub-pixels (12 sub-pixels by 12 sub-pixels).

Figure 7G:
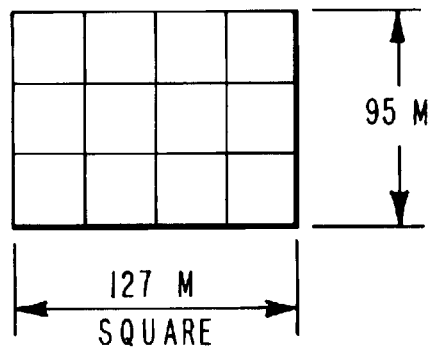
FIG. 7G is an exploded illustration of a pixel formed by laser ablation transfer comprising twelve sub-pixels.

Pixels may be formed in any shapes and sizes, however, pixels are commonly formed in either square or rectangular shapes. For example, some color filters have wider horizontal than vertical pixel dimensions, i.e. pixel dimensions of 127 microns horizontally by 95 microns vertically (FIG. 7G). In this case, assuming the pixel is composed of a row of three vertical sub-pixels and four horizontal sub-pixels, the pixel would be an improvement by a factor of twelve over the "single area pixels" commonly used and observable "drop out" would be virtually nonexistent.

Therefore, the greater the number of sub-pixels used to form a pixel, the greater the margin of error in pixel formation and consequently the greater the yield. The greater the yield, the more efficient production is and, in turn, the lower the cost of production. When the presently preferred embodiment of sixteen sub-pixels is used to form a pixel, the absence of one of the sixteen sub-pixels is not distinguishable by the human eye. In fact, the absence of two, three, or even four sub-pixels from a pixel composed of sixteen sub-pixels will likely result in little or no effect to the human eye. It is virtually inconceivable that more than four sub-pixels will be absent from a given pixel and, therefore, using sixteen sub-pixels to form each pixel results in virtually 100% yield as opposed to the 50% yields currently found in the commonly used color filter processes.

Figure 1:
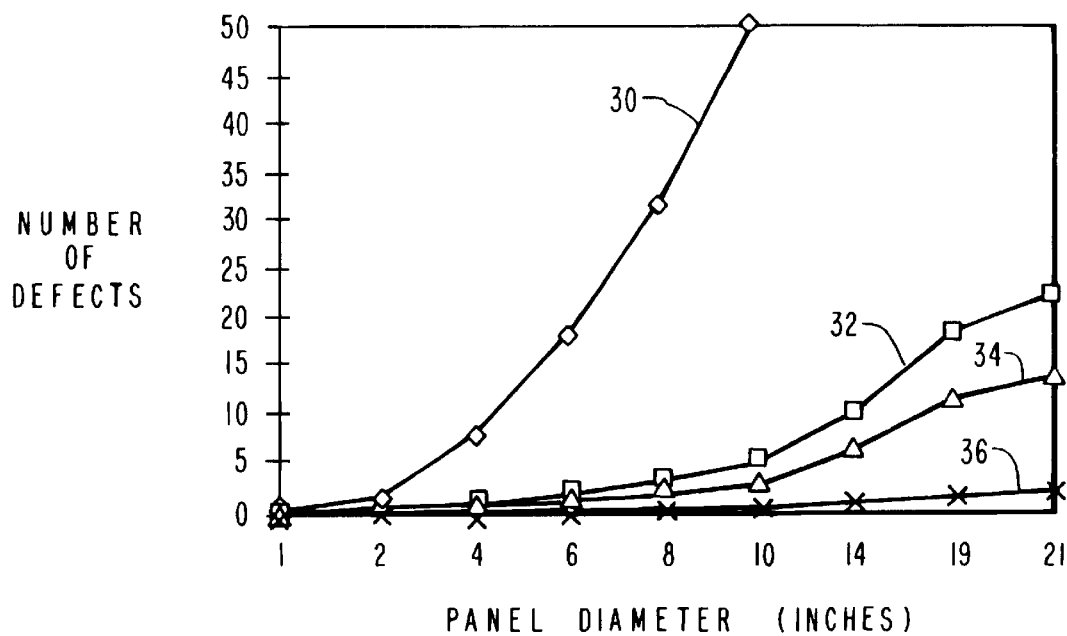
FIG. 1 is a graph illustrating the prevalence of defects in color filter processing.

FIG. 1 shows that, as the color filter panel size increases, the number of panel defects rises dramatically. When the normal defect level of one defect per square inch is observed, as illustrated by reference character 30, it can be seen that the number of defects quickly rises. Simply by cutting the defect level to 0.1 defect per square inch (32), a substantial improvement in yield is observed. Where pixels are composed of multiple sub-pixels, the defect level diminishes to virtually no observable defects per ten square inch color filter panel.

Still further, using a plurality of sub-pixels to form each pixel avails the producer of color filters the ability to maintain a high color image resolution as well as an increased yield. When a high yield is the primary concern, the number of sub-pixels per pixel is increased, whereas when increased resolution is desired, fewer sub-pixels per pixel are desired. Furthermore, the resolution may be increased by decreasing the pixel size and increasing the number of pixels per visual panel display. Although the optimal number of sub-pixels per pixel will vary from filter to filter, it is contemplated that the resolution will not be the primary concern because the resolution presently achieved with sixteen sub-pixels per pixel adequately meets the ability of the human eye to discern pixels. It is, however, anticipated that the primary concern will be to increase the yield by increasing the number of sub-pixels per pixel.

Pixels composed of a plurality of sub-pixels may be formed by any method capable of producing small areas of colorant that can be grouped together to form a pixel. One such method for forming sub-pixels and, correspondingly, pixels, is laser ablation transfer. As will be appreciated by one of ordinary skill in the art, various adaptations have been included in the laser ablation process to allow for the formation of color filters in high yields. Although laser ablation is presently the preferred process for forming pixels composed of a plurality of sub-pixels, it is appreciated that other methods, such as the thermodynamic printing method recited in U.S. Pat. No. 4,792,860 issued to Kuehrle, can be used.

Laser ablation transfer (LAT) imaging is a noncontact, intrinsically fast method of producing dry color images by direct laser writing. In general, images are prepared using laser ablation transfer by irradiating a donor film with an optical pulse, typically from a near-infrared laser, which induces a microexplosion in a gas generating layer of the donor film causing a high-speed mass transfer of a color coating from the donor film to a receiving substrate where the colorant adheres. Accordingly, the receiver substrate is located in close proximity, preferably in direct contact, to the donor film so that the colorant has only a small distance to travel.

Because the laser ablation transfer process involves mass transfer, both negative images formed on the donor film and positive images located on the receiver substrate are created simultaneously. An essential element in the laser ablation process is a film that undergoes laser ablation even though it has virtually no absorbance in the visible region. An advantage of the laser ablation technique is its compatibility with a wide variety of strongly colored dyes, pigments and inks. These two properties permit precise control over the color and image of the laser ablation product formed on receiver substrates.

Presently, two basic donor structures have been developed for laser ablation transfer. The first type consists of a polyester transparent substrate coated with a thin (typically 1 micron) color coating consisting of printing ink, including nitrocellulose and other additives, and a near-infrared absorbing dye. Further details of this process are contained in I-Yin Sandy Lee et al., "Dynamics of Laser Ablation Transfer Imaging Investigated by Ultrafast Microscopy," Journal of Imaging Science and Technology, Vol. 36, Number 2, March/April 1992, the disclosure of which is hereby incorporated by reference.

The second type of structure similarly consists of a polyester substrate coated with a thin color coating (typically 0.5 microns). However, the second type of structure contains an additional layer referred to as a dynamic release layer (DRL) consisting of a partially transmitting and absorbing film, preferably of titanium or metallic aluminum. In addition, absorbing dyes can be included in the color coating to lower the ablation threshold and to improve the adhesion of the dye to the receiver sheet. In further contrast to the first type of structure, the coating in the second type does not melt in the transfer process, but is removed as a solid flap of color coating. Furthermore, all the heat is concentrated at the aluminum substrate and aluminum coating interface in the second embodiment. Thus, a polymer in the color coating layer next to the aluminum is exposed to the heat, forms a gas, and ejects a pixel of colored material to the receiver sheet where it sticks to form a color image. Further details on laser ablation transfer can be found in William A. Tolbert et al, "High-Speed Color Imaging by Laser Ablation Transfer with a Dynamic Release Layer: Fundamental Mechanisms," Journal of Imaging Science and Technology, Vol. 37, Number 4, July/August 1993, the disclosure of which is hereby incorporated by reference.

The laser ablation technique utilized in the present invention to form images on the color filter, provides a gentle, intrinsically fast method of manufacturing color filters. Any suitable mechanism that will transfer the colorant from the donor film to the receiver substrate can be used, although lasers are preferred for their clean, easy manner of transferring minute dye and other colorant particles, to form precise images. Furthermore, lasers are ideally suited for use in imaging systems because they can be turned "on" and "of" rapidly, and when working in conjunction with an X-Y micro-positioning plot the entire color filter can be "digitally" processed.

Figure 2:
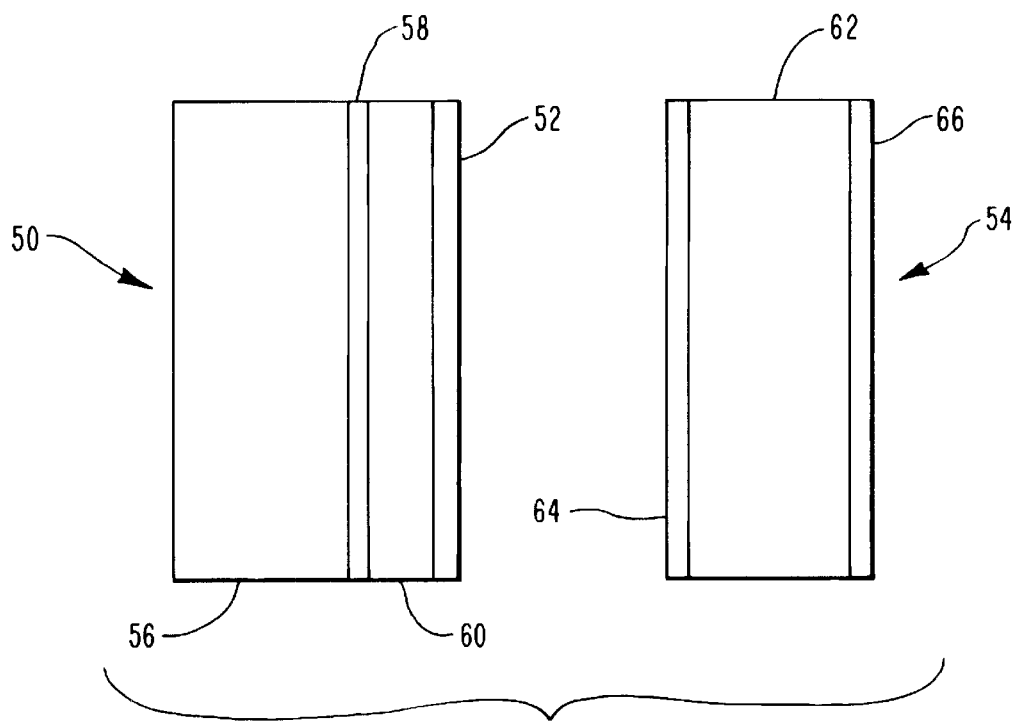
FIG. 2 is a side view of a donor film and a receiver panel as used to form color filters in laser ablation transfer processes.

In a preferred embodiment of the present invention, as shown in FIG. 2, the color filters of the present invention are prepared using a donor film 50, having a layer containing a primary colorant 52 and a receiver panel 54 located in close proximity, preferably in physical contact, to the donor film. The primary colorant can be any dye, pigment, ink, mixtures thereof, or other material used to color objects. Upon irradiation of the donor film with the appropriate wavelength, the colorant on the donor film is transferred from the donor film to the receiver panel. As a result of this mass transfer, a negative image is produced on the donor film, as a positive image is simultaneously produced on the receiver panel.

The laser ablation technique has proven to provide a simple, delicate method of producing pixels or color filters without harsh heating, wet chemicals and tedious mechanical steps. The laser causes a colorant to be quickly and precisely transferred from a colorant donor to a colorant receiver without any stress between the colorant donor and the colorant receiver. Hence, the receiver panel, which becomes the color filter, can be composed of a material thinner than has heretofore been possible.

In a preferred embodiment of the present invention, the donor film 50 is composed of a transparent donor substrate 56, a laser absorption layer 58 on the donor substrate, a gas generation layer 60 located on the laser absorption layer, and a layer containing a primary colorant 52. The receiver panel 54 which receives the colorant and subsequently becomes the color filter is composed of a transparent receiver substrate 62, preferably glass. In a more preferred embodiment, to aid in adherence of the colorant on the receiver panel 54, a polymeric layer 64 is added to the surface of the receiver substrate 62 on the side closest to the donor film 50. In addition, to aid in supporting the receiver substrate 62, a support 66 can be added to the surface of the receiver substrate 62 opposing the adherence aiding polymeric layer 64.

Figure 3:
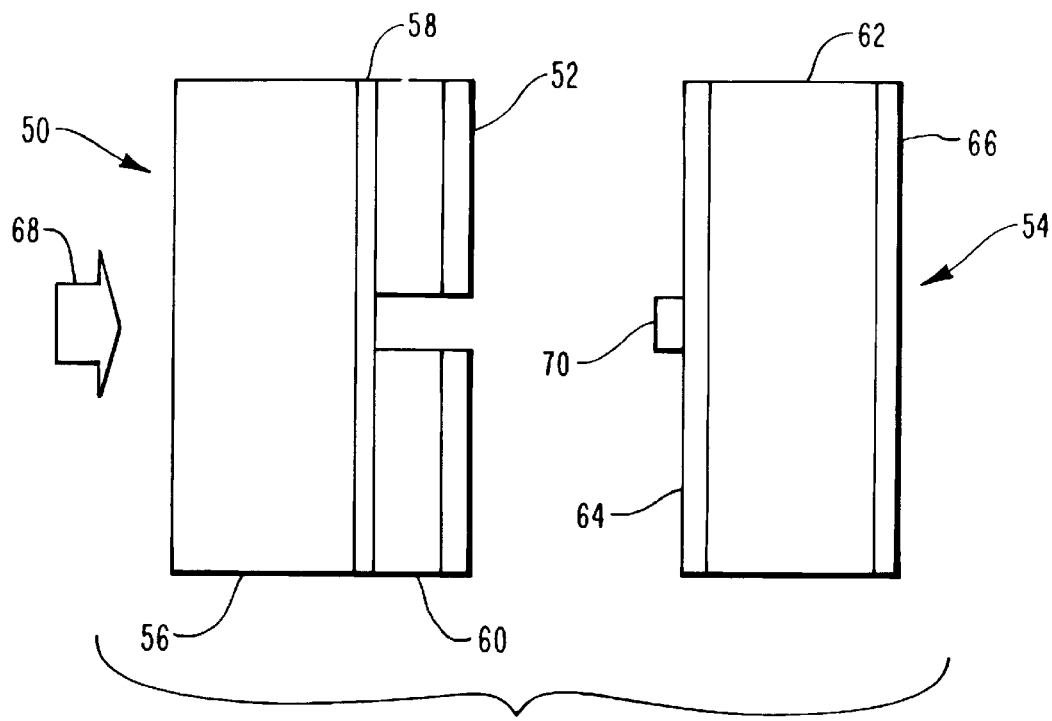
FIG. 3 demonstrates the laser ablation transfer of a sub-pixel from a donor film to a receiver panel.

FIG. 3 illustrates a preferred method for producing a single area of colorant (dot) on a receiver panel that subsequently becomes a color filter using laser ablation transfer. First, the donor film 50 and the receiver panel 54 are oriented in close proximity to one another. Although this distance can vary, it is preferred that the donor film and the receiver panel be in physical contact with each other. A laser beam 68 having a wavelength typically in the range between 760 to 920 nm, preferably 760, 820 or 920 nm is focused to a desired diameter, such as approximately 30 microns, onto the donor film. It is noted that the size of the sub-pixel can be varied, typically by varying the size of the laser beam. The laser irradiates the donor substrate 56 with submicrosecond, near IR laser pulses which are absorbed by the laser absorption layer 58. The laser absorption layer 58 transforms the radiation into heat resulting in a localized jump in temperature which is communicated from the laser absorption layer 58 to the gas generation layer 60, causing the gas generation layer 60 to vaporize or partially decompose in a type of microexplosion. The gas generated by the decomposition of gas generation layer 60 propels the primary colorant layer 52 to the receiver panel 54 in the form of a dry mass or molten drop (depending on the structure type of donor film 50) with a force sufficient to attach the mass to the receiver panel, where it substantially instantaneously cools to form a sub-pixel 70. The sub-pixel 70 formed can be grouped with other sub-pixels to form a pixel or may itself be a pixel. By keeping the receiver panel 54 fixed in one place, the donor film 50 can be exchanged in sequence for each of the three primary colors to produce the color filter.

The gas generation causes the colorant to be expelled from the donor film at velocities approaching 331 meters per second. Here again, the size of sub-pixel 70 generated corresponds to the size of the laser beam 68 irradiating donor film 50. Using the above mentioned technique, images can be produced on the receiving panel at a typical frequency of $10^7$ pixels/second.

Figure 4:
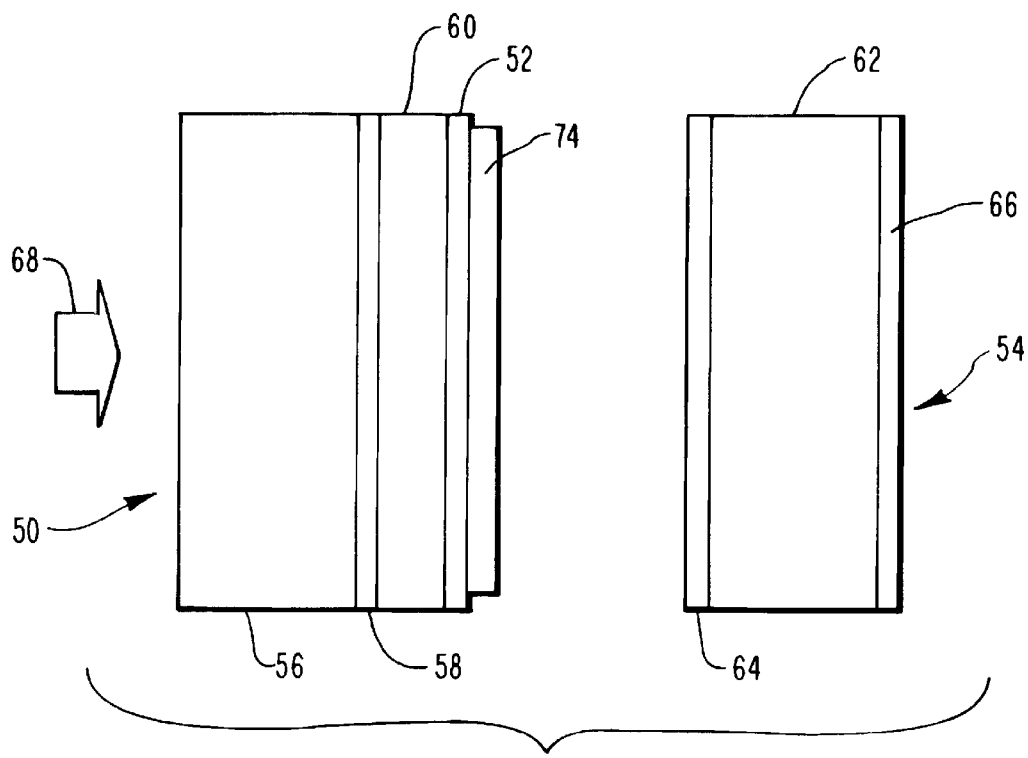
FIG. 4 illustrates an alternative embodiment of the laser ablation process wherein the donor film includes an adhesive layer on the surface of the colorant-containing layer to aid adherence of a sub-pixel to a receiver panel.

In a preferred embodiment, a coating, preferably a polymeric material, can be deposited onto the surface of the receiver panel 54 by wet or dry methods (i.e., vapor deposition) to aid adherence of the primary colorant to the receiver panel 54. In still a further preferred embodiment illustrated in FIG. 4, an adhesive layer 74 is added to the outer surface of the donor film 50 on the colorant layer, so that when the colorant is thrust from the colorant donor to the receiver panel 54, the colorant will adhere to the receiver panel 54.

The diameter of the sub-pixels produced in laser ablation transfer can be varied based on the diameter of the laser beam focused onto the donor film. Hence, depending on the use of the filter, the sub-pixel size can be optimized by varying the diameter of the laser beam. Furthermore, in contrast to other color filter manufacturing techniques, laser ablation transfer can be made to occur faster than any significant transfer between the irradiated spot and its surroundings by using a short duration laser pulse, thus limiting the laser ablation transfer effect to the region being irradiated.

In a preferred embodiment of the present invention, the laser is preferably programmed to strike specific areas, to form desired patterns. This is an improvement over current processes for making filters, which not only require multiple steps, but for example in photolithography, require masks to define the boundary areas of ultraviolet light on the resist, which tends to be cost intensive. For three color filters having these colors, three masks must be employed, tripling the cost of filter preparation. The present invention replaces these hardware based processes with a computer that simply directs a laser to form the pattern required.

The radiation used in the laser ablation process can be produced by any suitable laser with sufficient power to transfer the pixel from the donor substrate to the receiver sheet. Typically, the energy in the laser beam should be greater than 200 millijoules/cm$^2$. The wavelength of the laser used is related to the focal width, which, in turn, will relate to the number of sub-pixels per inch that can be transferred. In general terms, as the wavelength decreases from the infrared region through the visible region to the ultraviolet region, the spot size can correspondingly be decreased, since the spot size is directly related to the wavelength. This being the case, the shorter the wavelength, the more sub-pixels can be transferred per linear inch. Semi-conductor diode infrared lasers are commonly used in this process because they possess sufficient energy to cause transfer, while at the same time being relatively inexpensive and simple to operate.

In a preferred embodiment of the present invention, the laser is a solid state diode type laser operating at 860 nm, 820 nm or 780 nm. Other suitable lasers that may be used include, but are not limited to: neon-helium lasers (632.8 nm); argon ion lasers (488 nm or 514 nm); carbon dioxide lasers (10.6 $\mu$m); YAG (Yttrium Aluminum Garnet) lasers in frequency double mode: ($\lambda$=532 nm); Nd:YLF; (1.05 $\mu$m); Ruby (Cr: Al$_2$O$_3$) lasers (694 nm); and ultraviolet emission lasers such as XeCl (308 nm) or KrF (249 nm). It is readily understood that the laser used in the laser ablation process can be programmed to strike a specific area of the donor film so that color filters having the desired pattern may be formed.

The donor substrate 56 generally has a thickness between approximately 12 $\mu$m and approximately 250 $\mu$m, preferably 50 $\mu$m, and can be any laser transparent material that allows the laser radiation to travel to the laser absorption layer 58, provided it is dimensional stable. Suitable substrates include polyesters such as polyethylene terephthalate; polyamides; polycarbonate; glassine paper; condenser paper; cellulose esters; fluorine-based polymers; polyethers; polyacetals; polyolefins; and polyimides.

The laser absorption layer 58 located on the surface of the transparent substrate is a thin coating of material that can preferably absorb wavelengths in the range between 630 nm and 990 nm, more preferably 780–860 nm, and further imparts virtually no color to the resultant receptor film. Preferably, the laser absorption layer is a metal that completely oxidizes to its corresponding transparent oxide upon exposure to heat, so that the optical properties of the resulting color sub-pixels are not degraded by any residual laser absorption layer that may have followed to the receiver panel. Suitable metals include Al, Ti, Hf, or any alloys of these metals. In addition, other absorbing metals, or antireflective metals such as Al/Ge, Ti/Si or Al/TiO$_x$ or even optical cavities can be employed, such as opaque metaldielectric absorption layer designs. In the preferred embodiment, the laser absorption layer is titanium.

The laser absorption layer generally has a thickness between approximately 50 and approximately 300 angstroms, and preferably is approximately 200 angstroms for a single metal. The thickness of the laser absorption layer is important for a number of reasons. First, the absorption of the layer is directly related to the thickness of the layer, thus, it is important that the laser absorption layer have a thickness sufficient to absorb a sufficient amount of radiation and consequently provide a sufficient amount of heat to cause the organic layer to decompose. Furthermore, the laser absorption layer may accompany the colorant to the receiving layer, and if the absorption layer is of too great a thickness, the amount accompanying the colorant to the receiving layer may adversely affect the color of the resultant pixels.

Thicker layers of the absorbing layer may also be undesirable from the standpoint of raising the energy threshold for ablation since more material must be heated.

The gas generating layer 60 in the donor film of the present invention can be any material that will produce a gas bubble in a type of microexplosion at temperatures less than 300° C., preferably less than 250° C., to propel a portion of the colorant layer to the surface of the receiver panel. In a preferred embodiment of the present invention, the gas generating layer is a transparent organic layer, such as polyethylene carbonate, polyvinyl chloride, ethyl cellulose, nitro-cellulose and polymers such as an acrylate containing a plasticizer having a low boiling point designed to decompose at low temperatures to produce a gas bubble sufficient to propel a colorant to a receiver panel. Typical plasticizers include chlorinated paraffins, organo-phosphates, phthalic acid derivatives and glycol derivatives. Low molecular components arising from partially uncured radiation or heat cured material, i.e. uncrosslinked components, may also be employed. The gas generating layer typically has a thickness of between approximately 0.1 microns and 5 microns, and is preferably in the range between 1 and 2 microns.

The colorant layer 52 preferably comprises a polymer resin and a colorant material. The polymer resin used in the colorant layer can be any suitable polymer, such as acrylates, polyimides, polyurethanes or waxes, that are capable of maintaining their integrity during the manufacturing process steps. As mentioned above, the colorant can be any suitable dye, interference and non-interference pigment, ink or mixture thereof. Moreover, both the colorant and polymer should be light stable to produce quality color filters that do not degrade in time due to light exposure.

The wide variety of colored dyes, interference and non-interference, inorganic or organic based pigments, colored waxes, and inks that can be used in the laser ablation transfer process, makes it possible to produce high-resolution color images, especially when exact selection is critical. Transferable dyes include those based on azo, anthraquinone, quinophthalone and methine chemistries. Furthermore, the laser can transfer mass colorants (sub-pixels) as small as 10 microns in diameter. Therefore, the number and size of the pixels can be varied to include larger or smaller pixels, and more or fewer pixels per display, to optimize the resolution of the display. By optimizing pixel color and size, using laser ablation transfer, a resolution comparable to that of photolithography (10 to 20 microns) can be achieved.

The receiver panel 54 can be composed of any non-birefringent material that suitably receives and retains the colorant propelled from the donor film such as a transparent substrate having a thickness of about 25 microns to about 250 microns, preferably a glass sheet having a thickness of about 25 microns to about 50 microns. Until the present invention, glass of this thickness has not been feasible because of the strain and stress exerted on the receiver panel during conventional manufacturing processes. However, because there is no stress between the donor film and the receiver panel in laser ablation transfer techniques, delicate materials such as micro-thin glass can be employed in the production of color filters. The use of layer 66 aids in maintaining the integrity of the thin glass color filters. The thickness or lack thereof, of the receiver allows for a thinner, lighter color filter product that improves image quality. These qualities are especially useful in compact color displays, such as lap top computers.

In a preferred embodiment, the receiver panel further comprises an adherence aiding layer 64, located on the transparent substrate nearest the donor film. Any material that will aid adherence of the colorant/polymer material transfer can be used, suitable materials include, but are not limited to: polyamides, melamines, acrylics, polyurethanes or polyesters and other high energy surface materials.

In an alternative embodiment, an ultraviolet, visible light or heat activated adhesive is used to selectively remove sub-pixels from a donor film. In the present embodiment, the donor film and the receiver panel are oriented so that the heat activated adhesive layer 74 of the donor film and an adherence aiding layer 64 on the receiver panel are in contact. Using the heat activated system, a laser beam 68 heats up a selected area, i.e., 30 microns in diameter, of an absorption layer 58 which causes the adhesive layer 74 to activate and bond the colorant layer 52 to the adherence aiding polymeric layer 64 of the receiver panel 54. Instead of functioning as a gas generating layer, layer 60 may function as a release layer allowing the color sub-pixel to transfer to the receiver panel. In this case, layer 60 may include compositions of cellulose, fluoropolymer, silicone or wax based chemistry. As with other embodiments of the laser ablation transfer process, the size of the heated area can be varied by adjusting the diameter of the laser beam radiation. Subsequently, upon removal of the receiver panel 54 and the donor film 50, the sub-pixels produced by the laser ablation process are released to the panel. Here again, by keeping the receiver panel 54 fixed in one place, the donor film 50 can be exchanged in sequence for each of the three primary colors to produce the color filter.

Any suitable adhesive material that does not adversely affect the optical quality or color of the filter can be used for the adhesive layer on the donor film, including: cyanoacrylates, nitrile-phenolic elastomers, epoxides, polyesters, modified acrylics, polyurethanes and polymethyl methacrylate or other materials that will bond to the receiver layer surface (64). Alternatively, the adhesive layer can contain infrared absorbing, but visibly transparent materials, such as infrared absorbing dyes, to aid the absorption of infrared radiation used to heat the adhesive layer 74.

Figure 5:
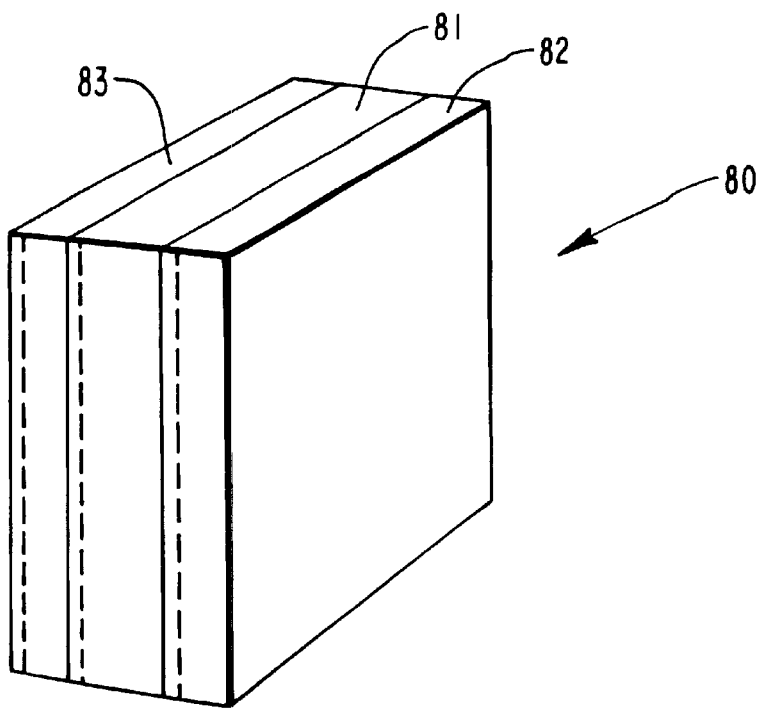
FIG. 5 illustrates a color filter construction comprising the combination of three microsheet layers, each sheet comprising pixels associated with a primary color.

In a further related embodiment of the present invention, laser ablation transfer can be used to form color filters wherein a filter substrate comprising a transparent substrate and a colorant layer on the transparent substrate becomes the color filter. The colorant layer comprises a primary dye, pigment, ink or other colorant and an absorbing material, as disclosed above, for absorbing the laser radiation. As discussed above, laser ablation transfer involves mass transfer resulting in a positive image being formed on a receiver and a negative image being formed on the donor. Accordingly, it is possible to ablate all the colorant except the desired sub-pixel arrangement using a filter substrate having a colorant layer on one side of a thin transparent substrate. The present process is repeated three times, one for each primary color to produce three separate filter panels 81, 82 and 83 which are laminated, aligned and bonded together to form a color filter as illustrated in FIG. 5.

Alternatively, due to the precise nature of the laser ablation technique, one filter substrate can be coated on both sides, one side with one primary color and the other side with another primary color. Subsequently, sub-pixels corresponding to the two primary colors can be formed by removing everything but the sub-pixel arrangement by laser ablation, i.e. blue sub-pixels on one side of the sheet and red sub-pixels on the opposing side. The filter substrate comprising colors on both its front and back surfaces is combined with another filter substrate comprising sub-pixels corresponding to the third primary color. The two filter substrates are laminated, aligned and bonded together to form the color filter. This process reduces the thickness and the weight of the filter. Whether two or three donor films are used, the thinness of the transparent substrates used prevents any substantial parallax from occurring.

Figure 8:
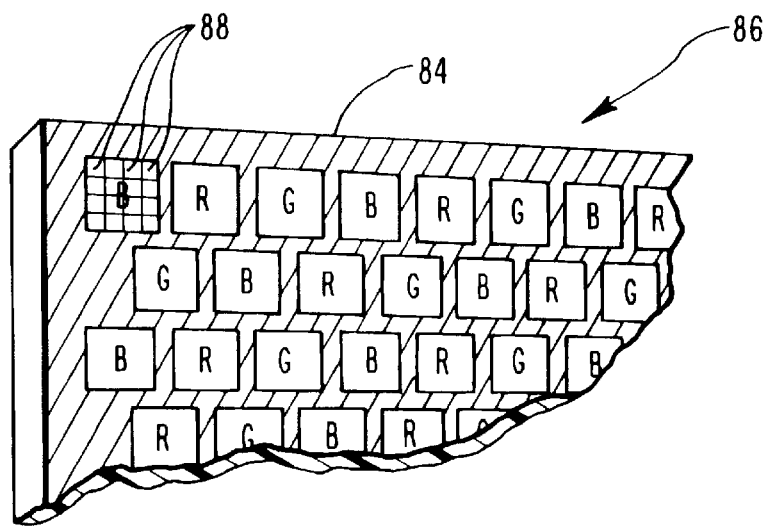
FIG. 8 is a view of a black matrix formed on a color filter.

In still a further embodiment, as illustrated in FIG. 8, the black matrix grid 84 surrounding the color pixels can be formed using laser ablation transfer. FIG. 8 illustrates a color pixel comprising sub-pixels 88, surrounded by a black matrix grid 84. The role of the black matrix is to block the thin film transistor from the light, separate the color patches from each other, to define the areas of the pixels, and to improve the contrast ratio of the color filter by preventing color contamination or light flare. The laser ablation transfer process is used in the same manner as described above for the formation of sub-pixels on the receiver panel: (i) the donor film is irradiated with a suitable wavelength; (ii) the absorbing layer heats up causing the gas generating layer to decompose producing a gas bubble; (iii) the gas produced by the gas generating layer propels a mass of black colorant precisely to the desired location on the receiver substrate to form a black matrix 84 surrounding and slightly overlapping the color pixels.

Alternatively, as mentioned above, pixels composed of a plurality of sub-pixels can be formed by the thermodynamic printing process disclosed in U.S. Pat. No. 4,792,860, the disclosure of which is hereby incorporated by reference. Accordingly, the pixels of the present invention are prepared by forming a printing means having a printing surface and a multiplicity of independently electrical chargeable capacitor microcells adjacent to the printing surface. Selected microcells are activated in accordance with incoming data so that the activated microcells are geometrically related to the sub-pixels printed. Electrical charges are deposited on the microcells selected for activation at controlled variable colombic charge levels to create, at the printing surface, localized electric fields of various strengths that are proportional to the print densities desired for the related data in the sub-pixels printed. The printing surface is then contacted with a voltage sensitive ink, whereby the ink, under the influence of said fields, is deposited on the printing surface only at the locations of the microcells selected for activation, with the thickness of each of the ink deposits being proportional to the strength of the field at that microcell thereby to form a uniform or a variable thickness ink pattern on the printing surface. The sub-pixels are subsequently transferred to the printing medium to form a pixel. By adjusting the thickness of the print layer, compensation for absorption strengths of the colorants is easily accomplished.

Using the present method, sub-pixels of any size ranging from as small as about 10–50 microns can be formed. The printing medium onto which the sub-pixels are transferred can be any suitable substrate, including glass and plastic substrates, having a wide range of thicknesses. These substrates will become the color filters. Furthermore, the thermodynamic printing method is capable of printing fully variable color filters utilizing pixels comprising a plurality of sub-pixels, on demand at speeds in excess of 1 sq. meter/sec.

In addition, the present thermodynamic printing method can be used to form the black matrix 84 illustrated in FIG. 8. The thermodynamic printing process is performed in the same manner as described above, except, a black colorant is deposited onto the printing medium to form a black matrix surrounding, and typically slightly overlapping with, the color pixels.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A color filter for use in visual displays, comprising:
   (a) a glass transparent substrate having a thickness of about 25 microns to about 250 microns, the transparent substrate having a black matrix grid on a surface thereof; and
   (b) a repeating pattern of color pixels on the surface of the transparent substrate, the color pixels substantially surrounded by the black matrix grid, each of the color pixels comprising a plurality of individual sub-pixels that are individually formed on the substrate separately from other sub-pixels so that a failure in the formation of one sub-pixel will not result in the failure to form adjacent sub-pixels, and so that an omission from the surface of the substrate of less than all of the plurality of sub-pixels comprising a color pixel will not necessarily result in an unusable color pixel.

2. The color filter of claim 1, wherein the sub-pixels have a size from about 10 microns to about 50 microns.

3. The color filter of claim 1, wherein the plurality of sub-pixels of a color pixel is a number of sub-pixels from two sub-pixels to sixteen sub-pixels.

4. The color filter of claim 1, wherein the color pixels are rectangular in shape.

5. The color filter of claim 1, wherein the color pixels are square in shape.

6. The color filter of claim 1, wherein the repeating pattern of color pixels comprises red, green and blue pixels.

* * * * *